(12) United States Patent (10) Patent No.: US 8,195,982 B2
Marchant et al. (45) Date of Patent: Jun. 5, 2012

(54) SYSTEMS AND METHODS FOR MANAGING TESTING FUNCTIONALITIES

(75) Inventors: Scott Ian Marchant, Sydney (AU);
Steven James Hughes, Sydney (AU);
Randy Lee, Sydney (AU)

(73) Assignee: TestPro Pty Ltd, Castle Hill, NSW (AU)

( * ) Notice: Subject to any disclaimer, the term of this patent is extended or adjusted under 35 U.S.C. 154(b) by 0 days.

(21) Appl. No.: 12/820,188

(22) Filed: Jun. 22, 2010

(65) Prior Publication Data
US 2010/0299561 A1 Nov. 25, 2010

(51) Int. Cl.
*G06F 11/00* (2006.01)
(52) U.S. Cl. ............................................. 714/32; 714/46
(58) Field of Classification Search ........................ None
See application file for complete search history.

(56) References Cited

U.S. PATENT DOCUMENTS

| | | | | |
|---|---|---|---|---|
| 5,701,471 | A * | 12/1997 | Subramanyam | 717/124 |
| 5,854,930 | A * | 12/1998 | McLain et al. | 717/139 |
| 5,983,001 | A * | 11/1999 | Boughner et al. | 714/38.1 |
| 6,546,524 | B1 * | 4/2003 | Chankramath et al. | 716/136 |
| 7,287,190 | B2 * | 10/2007 | Rosenman et al. | 714/32 |
| 7,296,188 | B2 * | 11/2007 | Paternostro et al. | 714/38.14 |
| 7,346,891 | B2 * | 3/2008 | Anand et al. | 717/107 |
| 7,421,683 | B2 * | 9/2008 | Robertson et al. | 717/130 |
| 7,464,297 | B2 * | 12/2008 | Potter et al. | 714/38.14 |
| 2004/0006761 | A1 * | 1/2004 | Anand et al. | 717/101 |
| 2004/0041827 | A1 * | 3/2004 | Bischof et al. | 345/704 |
| 2004/0044992 | A1 * | 3/2004 | Muller et al. | 717/124 |
| 2004/0044993 | A1 * | 3/2004 | Muller et al. | 717/124 |
| 2004/0143819 | A1 * | 7/2004 | Cheng et al. | 717/125 |
| 2005/0021289 | A1 * | 1/2005 | Robertson et al. | 702/182 |
| 2006/0136579 | A1 * | 6/2006 | Linville et al. | 709/223 |
| 2006/0291398 | A1 * | 12/2006 | Potter et al. | 370/241 |
| 2007/0050676 | A1 * | 3/2007 | Bae | 714/38 |
| 2007/0214178 | A1 * | 9/2007 | Sheffler et al. | 707/104.1 |
| 2007/0234121 | A1 * | 10/2007 | He et al. | 714/33 |
| 2008/0115111 | A1 * | 5/2008 | Chang et al. | 717/126 |
| 2008/0270841 | A1 * | 10/2008 | Quilter | 714/38 |
| 2009/0100299 | A1 * | 4/2009 | Betawar et al. | 714/46 |
| 2009/0319317 | A1 * | 12/2009 | Colussi et al. | 705/7 |
| 2011/0055807 | A1 * | 3/2011 | Mahajan et al. | 717/107 |

OTHER PUBLICATIONS

An Object-Oriented Scripting Environment for the WEBs Electronic Book System. ACM ECHT Conference. Nov. 30, 1992. Institute for Automation and Operations Research, J. Monnard.*
c Book System. ACM ECHT Conference. Nov. 30, 1992. Institute for Au.

* cited by examiner

*Primary Examiner* — Christopher McCarthy (57) ABSTRACT

Described herein are systems and methods for managing testing functionalities. One such method includes receiving, from a test tool, data indicative of a user-created test script, being a data-bound test script in the present example. The data-bound test script is created for testing a target application, and is bound to a predetermined data set. This received data is then processed, thereby to define data indicative of an unbound test script. A user interface is provided for allowing a user to associate the unbound test script with one or more data sets selected from a repository of stored data sets. Responsive to a user command, data indicative of a new data-bound test scripts is defined based on the association of the unbound test script with the selected one or more data sets. This new defined data-bound test script is executable via the test tool. For example, instructions are provided to the test tool such that those scripts are executed for the testing of the target application. In some cases, multiple unbound test scripts are effectively bolted together to create more complex scenarios for testing.

21 Claims, 6 Drawing Sheets

SYSTEMS AND METHODS FOR MANAGING TESTING FUNCTIONALITIES

The invention relates to systems and methods for managing testing functionalities, and more particularly to computer implemented technologies for allowing a given testing script to be executed based on a selected one or more data sets.

Embodiments of the invention have been particularly developed for augmenting an existing testing tool, thereby to provide a framework whereby users can design and implement complex testing scenarios. While some embodiments will be described herein with particular reference to that application, it will be appreciated that the invention is not limited to such a field of use, and is applicable in broader contexts.

CROSS-REFERENCE TO RELATED APPLICATIONS

"Not Applicable"

STATEMENT REGARDING FEDERALLY SPONSORED RESEARCH OR DEVELOPMENT

All rights to this invention are claimed by Scott Ian Marchant, Steven James Hughes and Randy Lee. No sponsorship has been received in the invention's research or development.

BACKGROUND OF INVENTION

Any discussion of the background art throughout the specification should in no way be considered as an admission that such art is widely known or forms part of common general knowledge in the field.

There are a wide range of testing tools available on the market, with prime examples being Rational (by IBM) and Mercury (by HP). In general terms, such tools allow users to test a software application, for example by executing test scripts in that application, and reviewing the results of that execution.

In known test tools, it is usual for each test script to have its own data set, which is used during the execution of that script (that is, the data is bound to the test script, typically through the coding of the script). For example, the data set may include aspects of data such as user names, passwords, product identifiers, and so on. Where there is a desire to run a similar script, but with different data, there is a need to create a new script specifically bound to that new data. For example, consider a test script configured to test "login" functionality. In a simple scenario, such a test script would be bound to a data set that describes all users. If there were a desire, on the other hand, to run that script in respect of only a subset of users (for example users with administrator rights), conventional methodologies would require a user to create a new script bound to a data set that describes that subset of users.

Such approaches inevitably lead to an unwieldy number of scripts, which can cause significant complications if there is a desire or need to make a minor change to a given functionality. For example, a minor change to the "login" functionality may result in a need to individually modify a large number of test scripts that invoke the "login" functionality.

Various attempts have been made to streamline the manner by which test tools operate. These include the likes of record replay automation, data driven architecture and keyword-based architecture. Each of these has significant short fallings in the context of the above comments. For example, in a data-driven architecture, reduced script numbers comes at the expense of a fast-growing amount of data sets, which becomes untenable, whilst script number containment in a keyword-based architecture results in a high degree of complexity, requiring a high level of skill of script maintenance or the like.

There is a need in the art for improved systems and methods for managing testing functionalities.

BRIEF SUMMARY OF INVENTION

It is an object of the present invention to overcome or ameliorate at least one of the disadvantages of the prior art, or to provide a useful alternative.

One embodiment provides a method for managing testing functionalities, the method including the steps of:

receiving data indicative of a user-created test script, wherein the user-created test script is created for execution by a test tool;

processing the received data thereby to define data indicative of an unbound test script;

providing a user interface for allowing a user to associate the unbound test script with one or more data sets selected from a repository of stored data sets;

responsive to a user command, defining data indicative of a new data-bound test script based on the association of the unbound test script with the selected one or more data sets; and providing instructions for causing the test tool to execute the new data-bound test script.

One embodiment provides a system for managing testing functionalities, the system including:

an interface for receiving data indicative of a user-created test script, wherein the user-created test script is created for execution by a test tool;

a component for processing the received data thereby to define data indicative of an unbound test script;

a database for storing the data indicative of the unbound test script;

user interface components for allowing a user to associate the unbound test script with one or more data sets selected from a repository of stored data sets;

a component that is responsive to a user command for defining data indicative of a new data-bound test script based on the association of the unbound test script with the selected one or more data sets; and an interface configured to provide instructions for causing the test tool to execute the new data-bound test script.

One embodiment provides a computer system including a processor configured to perform a method as discussed herein.

One embodiment provides a computer program product configured to perform a method as discussed herein.

One embodiment provides a computer-readable medium carrying a set of instructions that when executed by one or more processors cause the one or more processors to perform a method as discussed herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE SEVERAL VIEWS OF THE DRAWINGS

Preferred embodiments of the invention will now be described, by way of example only, with reference to the accompanying drawings in which.

DETAILED DESCRIPTION OF THE INVENTION

Described herein are systems and methods for managing testing functionalities. One such method includes receiving, from a test tool, data indicative of a user-created test script, being a data-bound test script in the present example. The data-bound test script is created for testing a target application, and is bound to a predetermined data set. This received data is then processed, thereby to define data indicative of an unbound test script. A user interface is provided for allowing a user to associate the unbound test script with one or more data sets selected from a repository of stored data sets. Responsive to a user command, data indicative of a new data-bound test scripts is defined based on the association of the unbound test script with the selected one or more data sets. This new defined data-bound test script is executable via the test tool. For example, instructions are provided to the test tool such that those scripts are executed for the testing of the target application. In some cases, multiple unbound test scripts are effectively bolted together to create more complex scenarios for testing.

Framework Overview

Figure 1:
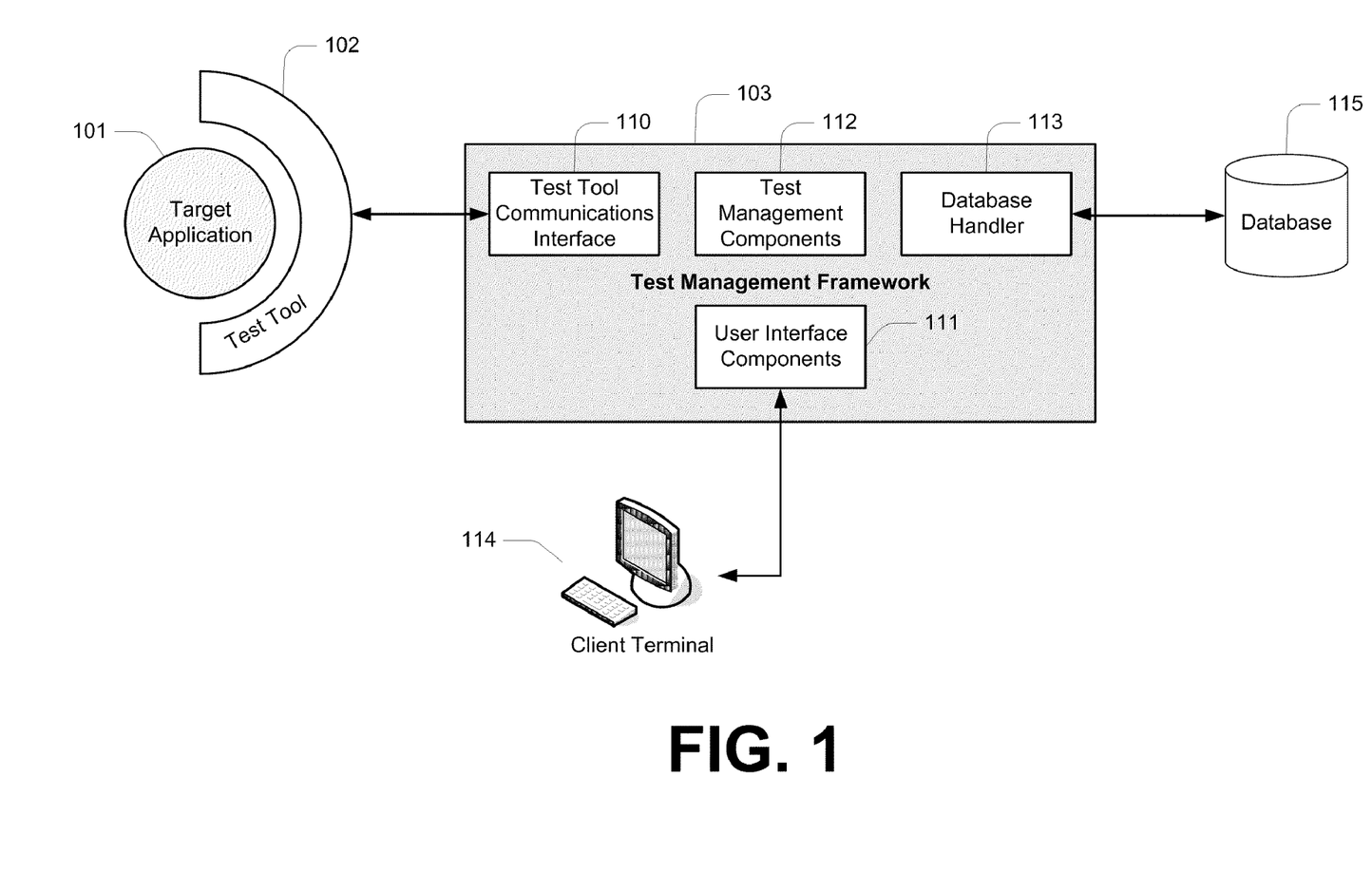
FIG. 1 illustrates a system according to one embodiment.

FIG. 1 illustrates an exemplary system for managing testing functionalities according to one embodiment. In overview, this system is configured for managing testing functionalities in relation to a target application 101, being a software application in respect of which testing is to be conducted. A test tool 102 is directly responsible for conducting the testing, for example in terms of running test scripts on the target application, and the like. Test tool 102 is in this embodiment a known test tool, such as Rational (by IBM) and Mercury (by HP), or for that matter substantially any other test tool. However, in some cases it may be necessary to perform minor patching to the test tool for the present purposes. It will be appreciated from the discussion herein how the present embodiments are able to be configured for operation with substantially any test tool. That is, the present invention is by no means limited to any particular test tool.

A test management framework 103 interfaces with test tool 102. In the context of FIG. 1, framework 103 is described in terms of a software product that is maintained on a carrier medium and executable on one or more processors of a computer system thereby to provide functionality. However, framework 103 is optionally able to be considered in terms of computer hardware that is configured to execute such a software product thereby to provide a corresponding functionality.

Framework 103 includes a test tool communications interface 110, user interface components 111, test management components 112, and a database handler 113. In a general sense, interface 110 is configured to allow communications between framework 103 and test tool 102, thereby to allow the framework to receive information from test tool 102 and provide instructions and/or information to test tool 102. Test management components essentially provide the substantive programming logic underlying framework 103, as discussed in detail further below. User interface components 111 allow a user of a client terminal (such as client terminal 114) to access functionalities made available through that substantive programming logic. For example, components 111 allow a user to define testing scenarios for execution via test tool 102 in respect of target application 101. Database handler 113 allows framework 103 to communicate with a data repository, presently in the form of database 115. This is presently a SQL database, although substantially any form of database (or, in a broader sense, information repository) may be used in other embodiments.

Test tool communications interface 110 is specifically configured to allow communications between framework 103 and a particular test tool 102, and in this manner effectively provides a translation interface for isolating other components of framework 103 from test tool 102. That is, for implementation in respect of a first test tool, framework 103 includes a first communications interface 110, and for implementation in respect of a second test tool, framework 103 includes a second communications interface 110. However, other components (such as user interface components 111, test management components 112, and a database handler 113) remain unchanged between those implementations. In this regard, the more substantive aspects of framework 103 are configured for broad ranging application across a plurality of varied test tools 102, once respective appropriately configured communications interfaces 110 are defined. This is particularly advantageous in allowing relatively more complex aspects of framework 103 to be utilized in a widespread manner across a plurality of test tools.

In some embodiments, there is a requirement to make modifications to test tool 102 to facilitate interactions with framework 103 (particularly communications interface 103). This is optionally achieved by way of a software patch or the like. It will be appreciated that this is a matter of design choice.

The nature user interface components 111 vary between embodiments. For example, in some embodiments framework 103 is a networked application which is stored in memory and executed at a central location, and components 111 allow client terminals connected to the network to access functionalities of framework 103 from their respective client terminals. For example, in one embodiment a browser application executes on terminal 114, and components 111 are responsible for delivering to terminal 114 (over the network) data indicative of a browser renderable user interface for framework 103. That data is rendered in the browser application, allowing a human user to interact with framework 103 via terminal 114. Data is passed between the browser and components 111 periodically, for example in response to postback events and the like. In other embodiments, framework 103 operates as a local application, and in that manner executes wholly or partially on client terminal 114 (for example some or all of the software instructions that embody framework 103 are maintained in internal and/or removable memory of terminal 114.

Test management components 112 embody the more substantive data processing aspects of framework 103. In this manner, they provide a link between communications interface 110, user interface components 111, and database handler 113. So as to provide a very generic example, responsive to a user command provided via user interface components 111, received by components 112, and processed by components 112 (which may include instructing handler 113 to obtain information from database 115). Based on this processing, components 112 instruct interface 110 to engage in specified interactions with test tool 102. More specific examples of such functionalities are described further below.

Although the present embodiment generally assumes a centrally located framework 103, in other embodiments a distributed framework is used. That is, various parts of framework 103 are optionally located for execution on distributed hardware, in some cases at distributed locations.

Method Overview

Figure 2:
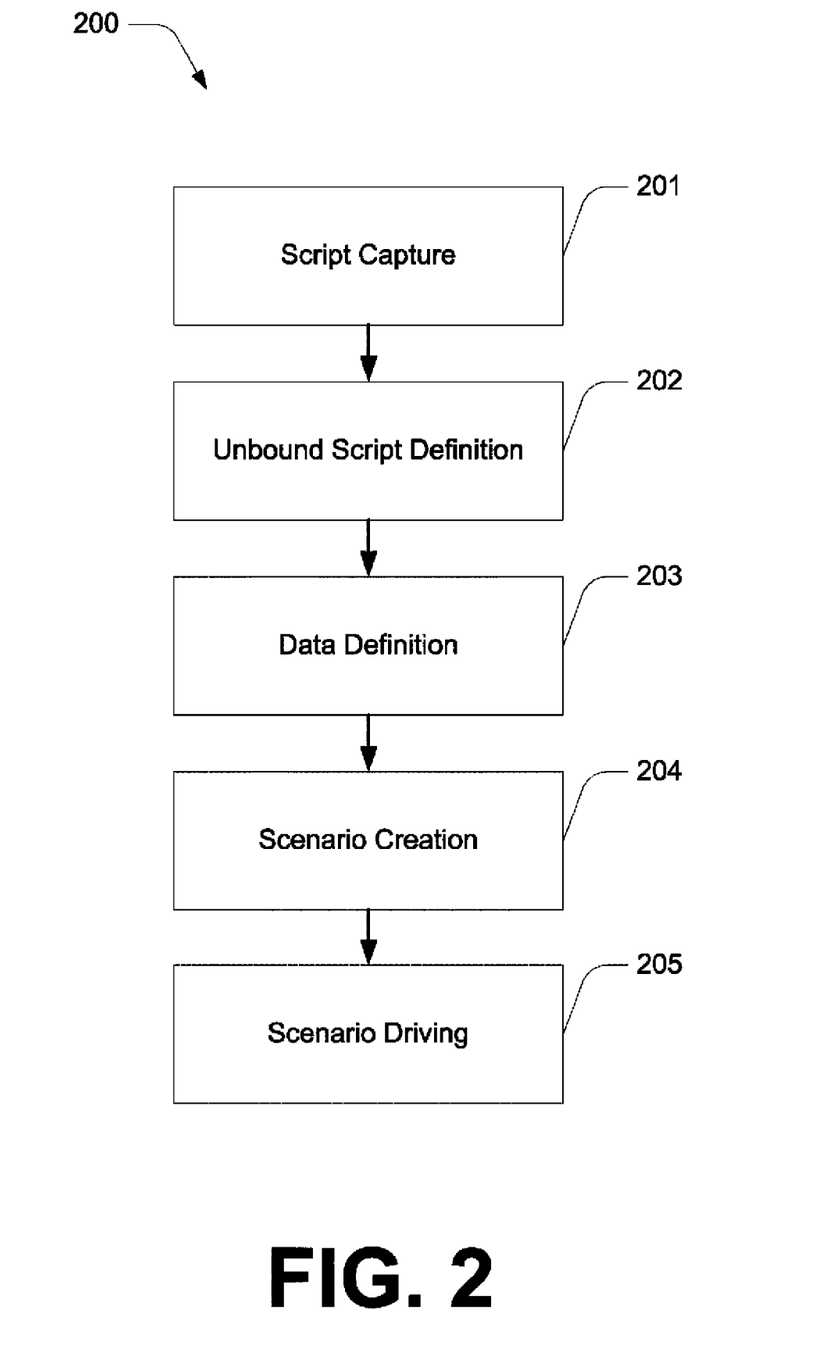
FIG. 2 illustrates a method according to one embodiment.

FIG. 2 illustrates an exemplary method 200 for managing testing functionalities according to one embodiment. As presently described, this method is performable based on the execution of software instructions (i.e. computer-readable code) that embody framework 103. Embodiments of the present invention include (but are not limited to) methods such as this, portions of this and similar methods, software instructions, carrier media that maintain such software instructions, and computer hardware configured for providing the functionality of this and similar methods (or portions of this and similar methods).

As context, method 200 includes five phases, which are not necessarily performed sequentially. That is, each phase of method 200 may be performed at substantially any time, independently or concurrently with other phases, provided the relevant inputs and data are available. In this regard, the ordering of phases in FIG. 2 is representative only, so as to show an overall process flow. A general overview of the phases is provided below, and more detailed explanation provided in subsequent sections.

Phase 201 is described as a script capture phase. In overview, a data-bound test script is user-created in (or for) test tool 102, and phase 102 includes receiving, in this embodiment from the test tool, data indicative of a data-bound test script. This phase is repeatedly performed over time as users create additional scripts in test tool 102.

Phase 202 is an unbound script definition phase. This phase includes processing data received from phase 201 (i.e. data indicative of a data-bound test script), thereby to define data indicative of an unbound test script. In the present embodiments, the unbound test script is not a "script" in the sense that there is no storage of scripting code. Rather, the unbound test script is a collection of referential data that allows framework 103 to define a new test script bound to user selected data.

The present disclosure deals with "data-bound" test scripts, and "unbound" test scripts. As context, a test script includes one or more variables, which are assigned values prior to the script being executable. For example, in terms of a simple "login" script, there are typically variables for a username and password. Such variables have a variable type (for example "username" and "password") and, in the case of a data-bound test script, values (such as the actual username and password values). In conventional test tools, scripts are inherently data-bound, meaning that the script is bound to a data set that defines the values for variables in that script. Where there is a desire to run a particular script based on a different data set, the usual approach is to copy the existing script, and modify that script based on that different data set. This often results in the creation of a large number of scripts (for example a login script for normal users, a login script for administrator users, a login script for users having particular specified characteristics, and so on). That is, there is a one-to-one relationship between scripts and data sets.

An "unbound" test script, on the other hand, is not tied to a particular data set. Rather, at least at a conceptual level, variables in an unbound test script are not assigned values. Some embodiments of the present invention are directed towards a framework that allows the utilization of unbound test scripts, such that a given script may be selectively bound to varied data sets, depending on the purpose of a particular script implementation. For example, a given unbound test script may be bound to a first data set for a first testing scenario, and bound to a second data set for a second testing scenario. That is, there is a one-to-many relationship between scripts and data sets. Furthermore, in some embodiments, there is a many-to-many relationship between scripts and data sets (i.e. a particular data set may be used for any of a plurality of unbound test scripts).

Data definition phase 203 includes defining one or more data sets for association with unbound test scripts defined at phase 102. These data sets are stored in an information repository, presently being database 115. Scenario creation phase 204 includes providing a user interface for allowing a user to associate unbound test scripts with one or more data sets selected from a repository of stored data sets. A user interacts with the user interface (presently provide by way of components 111) to create "scenarios". A scenario is, in essence, a proposed test for execution in respect of target application 101. It leverages one or more of the unbound test scripts, and one or more of the data sets. In the present embodiments, the following apply:

A given unbound test script is able to be associated with one or more data sets. That is, there is a one-to-many matching between unbound test scripts and data sets. At a practical level, this allows a given unbound test script to be associated with a first data set for the purposes of a first scenario, and associated with a second data set for a second scenario. This provides a significant departure from approaches of conventional test tools, which require the creation of two separate test scripts (being data-bound test scripts) to achieve that purpose.

Multiple unbound test scripts are able to be associated with a given data set. That is, a particular data set is able to be leverage for multiple scripts. Again, this is not possible in conventional test tools.

A given data set is able to be filtered for the purposes of association with an unbound test script. In this manner, only a subset of the data in that data set is associated with the test script. This is significant in that multiple test scripts are able to be executed using a single collection of script data and a single data set.

At scenario driving phase 205, framework 103 implements scenarios defined at phase 204 via test tool 102 (using communications interface 111). The term "driving" is used to describe the manner by which framework 103 essentially "drives" test tool 102 (for example by providing instructions, receiving results, and so on). This phase includes, responsive to a user command, defining data indicative of one or more data-bound test scripts based on the association of one or more unbound test scripts with a respective selected one or more data sets. These data-bound test scripts are executable via the test tool. In the present embodiments the data-bound test scripts are defined in terms of instructions, with a substantive portion of the script data being maintained at the test tool and finalized for execution only just prior to execution.

Script Capture Phase

As noted above, for the purposes of phase 201, scripts are created substantially in the conventional manner using tool 102. Data indicative of these scripts is then shared with framework 103 by way of interactions between interface 111 and tool 102. For example, various embodiments make use of the following arrangements:

In one embodiment test tool 102 is configured such that, upon the creation of a data-bound test script, data indicative of the new test script is provided to interface 111.

In one embodiment, upon the creation of a new data-bound test script, a user manually provides data indicative of the new test script to interface 111.

In one embodiment, interface 111 monitors test tool 102 such that, upon the creation of a new data-bound test script, data indicative of the new test script is obtained to interface 111.

In one embodiment, interface 111 periodically queries test tool 102 to obtain data indicative of the new test scripts.

In one embodiment, a user manually instructs framework 103 to obtain from test tool 102 data indicative of a particular test script.

Other approaches are used in further embodiments.

The nature of data received in framework 103 varies between embodiments. For the sake of the present example, the data includes at least data indicative of a location at which the script is stored. In some embodiments the data includes some or all of the script code (i.e. code defining the script).

In the present embodiment, scripts are defined in tool 102 using script templates specifically designed for framework 103. Such templates are provided to streamline the interaction between tool 102 and framework 103, for example in terms of information gathering, reporting, and error handling. An exemplary script template format is as follows:

TEMPLATE HEADER (includes data indicative of descriptors and actions for test script, etc)
SCRIPT BODY (includes conventional script data for tool 102)
TEMPLATE FOOTER (includes exception handling rules, information handling instructions, etc)

In essence, the script body is organized in substantially the same manner as would be used in tool 102 in absence of framework 103. This isolation of the script body is advantageous, particularly in the sense that it reduces the need for a user to learn any new scripting skills beyond what are already on hand for utilization of tool 102. That is, a user creates test scripts in substantially the usual manner, and then makes minor modifications to include those in a template specific to framework 103.

The relevance of the template header and template footer are discussed in more detail further below.

Unbound Script Definition Phase

In respect of each data-bound test script, in respect of which indicative data is received via phase 201, an unbound script definition process is preformed at phase 102. One example of such a process is provided by method 300 of FIG. 3. Once again, this method is by no means strictly limited to the illustrated ordering of steps. In the present embodiment, method 300 is performed in framework 103.

Figure 3:
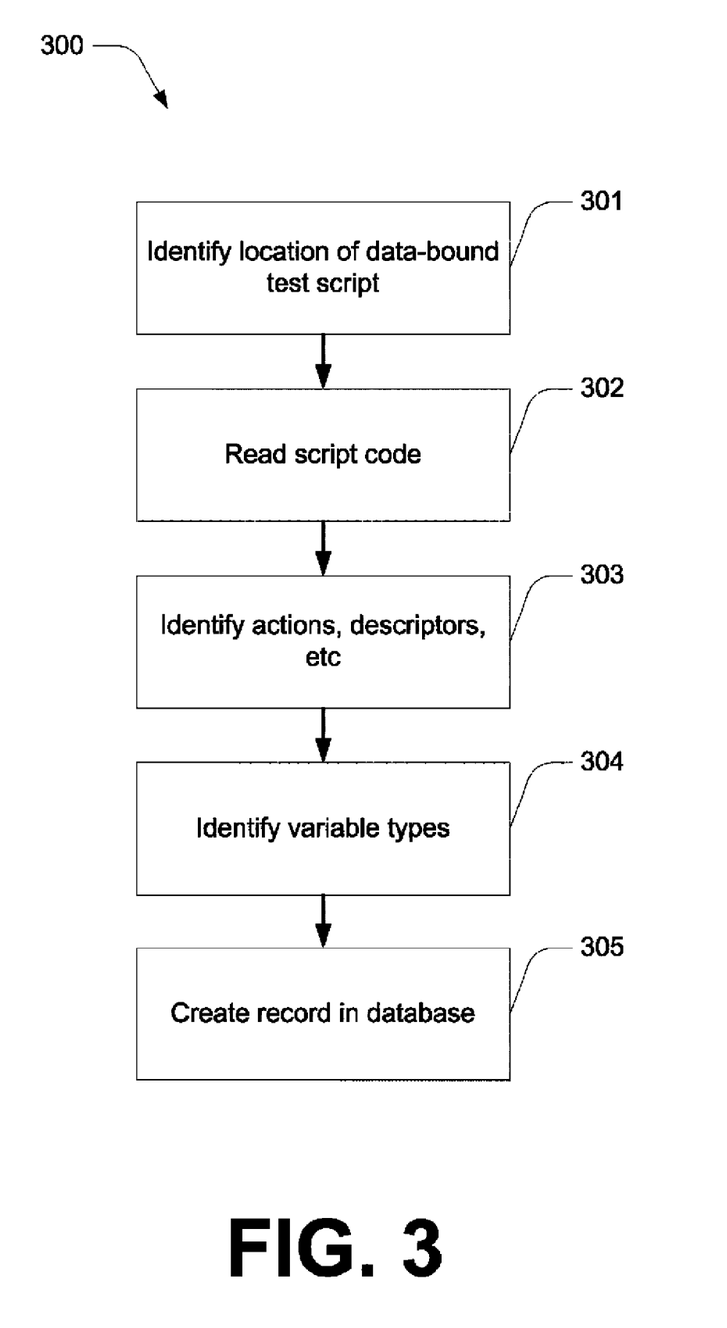
FIG. 3 illustrates a method according to one embodiment.

Step 301 includes identifying the location of the data-bound test script. In a general sense, the data-bound test script may be located at substantially any location accessible to test tool 102. In the present embodiment, framework 103 does not store a copy of the script. Rather, knowledge of the location is used so that the substantive script data may be leveraged on an as-required basis.

Step 302 includes reading the script code (for example parsing the code), thereby to gain a better understating of the script. This allows for framework specific information to be identified from the template header (such as descriptors and actions, which a user incorporates into the template header) at step 303. Furthermore, it allows variable types to be identified at step 304.

According to the present embodiment, framework 103 deals with "actions", this term being used to describe a test script functionality. In some cases, a test script is indicative of only a single action (such as a login or the like). However, in more complex cases, a test script is indicative of multiple actions, and which action is actually performed upon execution of the script depends on the setting of a variable. For example, a particular script might function as a "modify" or "delete" depending on the setting of a given variable. Actions are used to make scenario creation more user-friendly; a user creates a scenario based on actions rather than script names. Descriptors (which describe and action in plain English) further assist in this regard. A simple scripting logic is defined for allowing a user to include action and description information in the template header when creating a test script in accordance with such a header.

As noted above, a test script includes a plurality of variables. In the case of a data-bound test script (such as that read at step 302), each variable has a variable type and a value. Step 304 includes identifying the variable types, and is in this regard unconcerned with the values. For example, step 304 includes identifying that a particular test script includes the variable types "username" and "password". As context, this is used subsequently to allow the selecting of different variable values (i.e. data sets) for association with a script. That is, by knowing the variable types, it is possible to select one or more data sets for designating variable values for use in a scenario.

An unbound test script is defined at step 305. In the present embodiment, the unbound test script is defined by the creation of a record in database 115, that record including data indicative of:

The location of the data-bound test script upon which the unbound test script is based.
Data indicative of actions and descriptors.
Data indicative of variable types.

This is by no means intended to be an exclusive list, and various other aspects of data are also included in various embodiments.

It will be appreciated that, in the present embodiment, the data indicative of an unbound test script is not actually script data (i.e. code defining a script) in a conventional sense. Rather, the unbound test script is referentially defined (i.e. defined by reference to various aspects of data). However, in other embodiments an unbound script is defined in terms of script code, for example being based on the data-bound test script with variable values extracted and replaced with generic placeholders. However, the present approach is considered advantageous in that it avoids the need to replicate script coding data within framework 103. Furthermore, such an approach in some cases allows minor modification of scripts via tool 102 without resulting in a need to make corresponding modifications via framework 103 (provided such changes do not affect variable types).

Data Definition Phase

Once an unbound test script has been defined in database 115, framework 103 is configured to allow the creation of one or more data sets for association with that unbound test script. In this regard, user interface components 111 are configured to provide an interface by which a user can create a data set.

In the present embodiment, components 112 define a user editable file for facilitating the creation of a dataset via the user interface. For the sake of the present example, a spreadsheet file is considered (such as a MS Excel file), although other file formats are equally suitable. Regardless, in some cases the data sets are stored in a generic file format, such as CSV, regardless of the application used for their creation. The user editable data set is partially pre-populated to include variable type information (for example one column designated for "username" and one for "password"). A user is at liberty to include additional variable types, for example to assist in filtering, as discussed further below.

Conceptualizing a data set in spreadsheet form, columns are used to represent variable types, with the individual entries in rows representing variable values for the respective variable types, and rows effectively representing combinations of variable values. As discussed further below, each row is used to provide a unique iteration of a test script, by assigning the variable values of that row to the available variable types.

Scenario Creation Phase

User interface components 111 allow a user of a client terminal (such as client terminal 114) to create test scenarios. A test scenario is a proposed automated testing plan to be executed under the control of framework 103 via tool 102 in respect of target application 101. In the present embodiments, from a user perspective, a scenario is defined by a plurality of actions, and data sets associated with those actions. From a data perspective, however, the actions are in fact defined in terms of unbound test scripts, with appropriate variables set in cases where a particular script is configured for selectively performing alternate actions. That is, each "action" is associated with an unbound test script, and for some embodiments an action and unbound test script are one and the same.

In some embodiments, an added layer is provided such that a scenario is defined by one or more "test cases", each test case including one or more actions. It will be appreciated that this allows for an added degree of flexibility. For example, complex sequences of actions stored as test cases are able to be re-used across various scenarios. However, for the sake of simplicity, examples considered throughout the present specification do not deal with the intermediate level of test cases, and deal only with scenarios including one or more actions.

So as to provide a simple example of a scenario, consider the testing of an "add item" functionality. A simple scenario for testing such functionality might include a "login" action, an "add item" action, and a "log out" action. Each of these actions is associated with an unbound test script in database 115 (for example a login script, add item script and logout script, initially created in data-bound format using tool 102). This simple scenario example is revisited for explanatory purposes further below. However, it will be appreciated how complex scenarios are able to be defined based on a database having a range of available actions corresponding to unbound test scripts.

Figure 4:
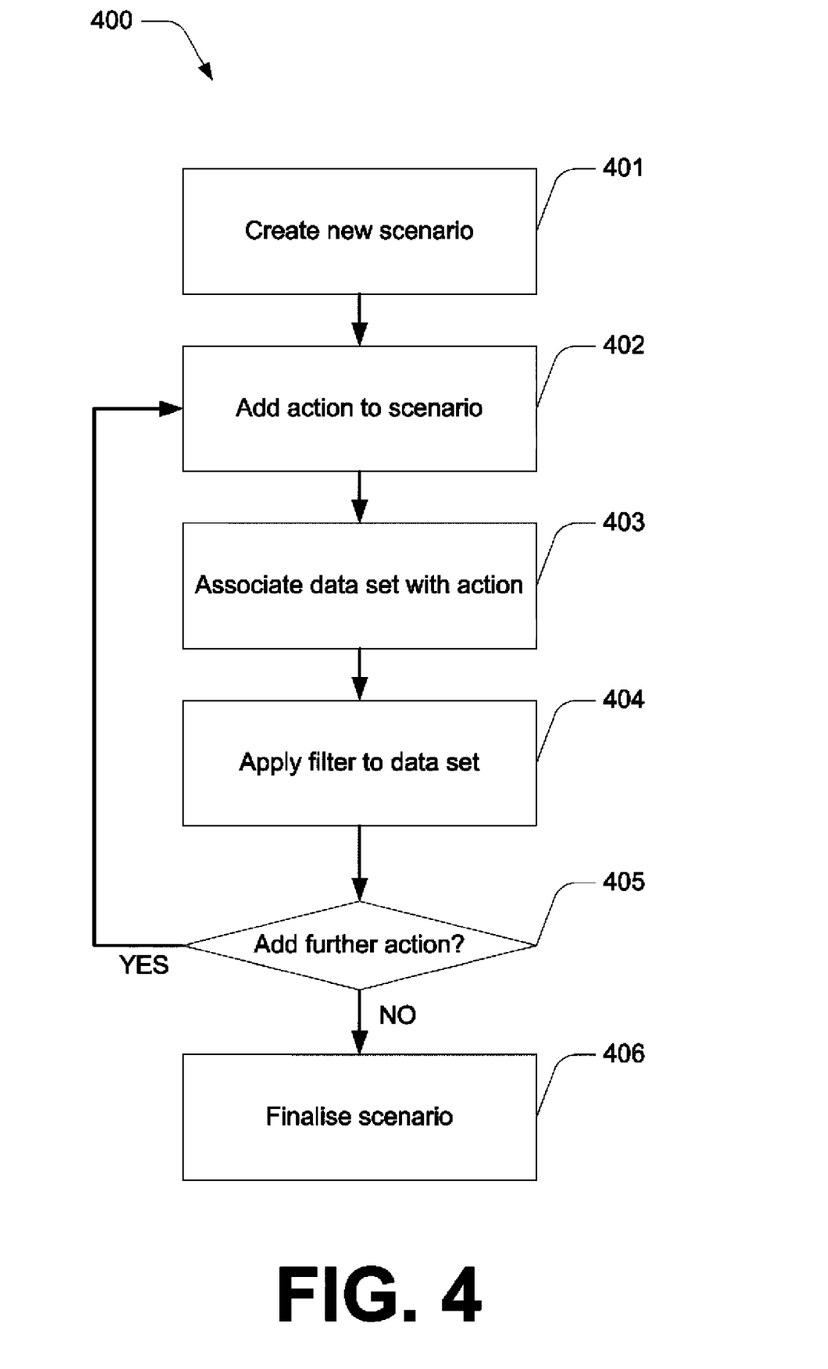
FIG. 4 illustrates a method according to one embodiment.
Figure 5:
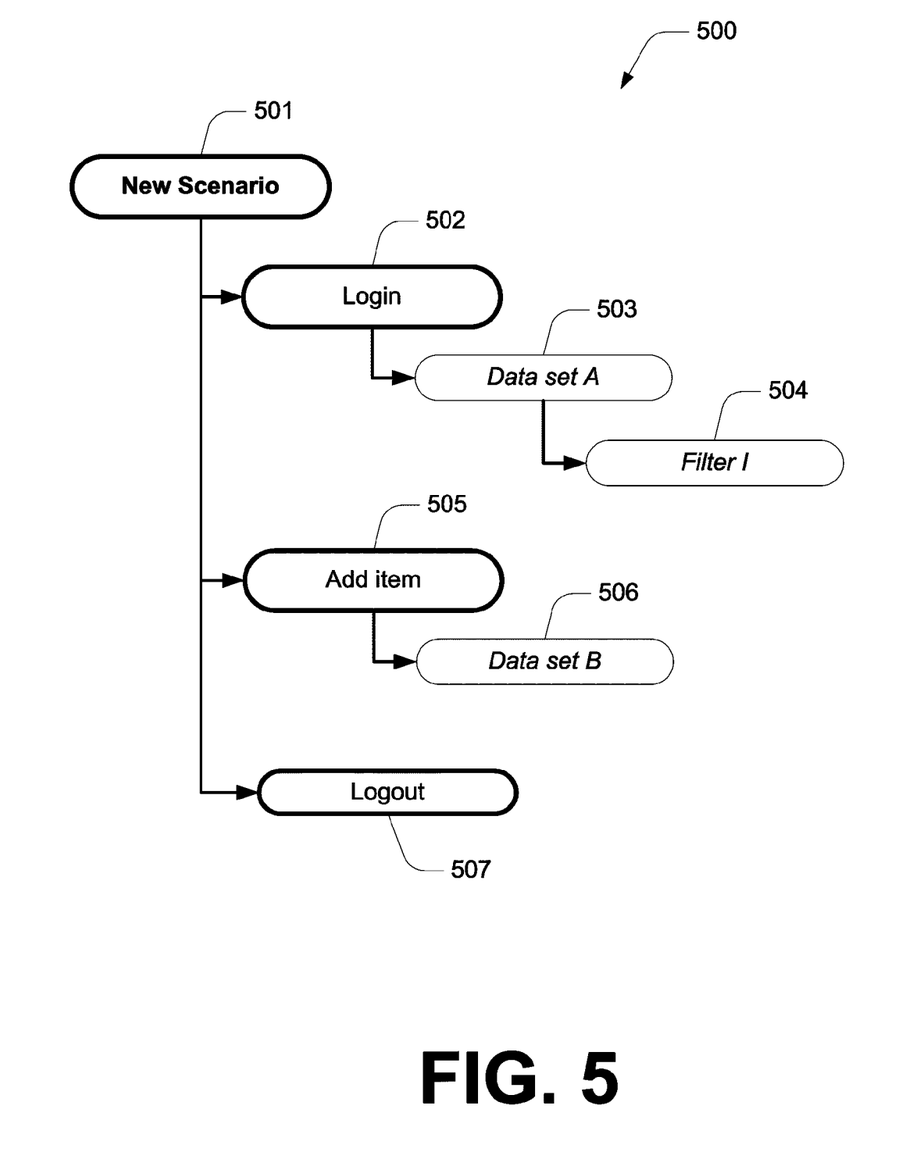
FIG. 5 illustrates a testing scenario according to one embodiment.

Method 400 of FIG. 4 provides an exemplary process for creating a scenario. This method is described in terms of a user process and complementary software-process, and in this regard it will be appreciated that there is a cause-and-effect relationship between actions of the user (i.e. data provided by the user via terminal 114 through components 111 to framework 103) and processes conducted within framework 103. Additionally, as with other flowcharts provided herein, the illustrated sequence of steps not essential and in some cases the steps may be performed out of sequence. FIG. 5 provides a graphical representation of an exemplary scenario 500, as rendered on a client terminal display, in accordance with an exemplary embodiment. It will be appreciated that FIG. 5 is provided for explanatory purposes only, and should not be considered as limiting in any way. In particular, there are a wide variety of approaches for representing a scenario such as scenario 500 in the context of a graphical user interface.

Step 401 includes creating a new scenario. For example, this is achieved by selecting an appropriate option in a GUI. At this point in the process, the scenario is empty (i.e. it contains no actions, and therefore has no substantive function). The scenario is represented by icon 501, which is a root icon for a tree structure.

A user adds an action to the scenario at step 402. For example, in some cases the user adds a scenario by way of a known name, and in other cases the user selects a scenario to add from a list of available scenarios (populated by way of querying database 115). In the present example, the user initially selects a "login" action. In the context of FIG. 5, the user first adds a "login" action, which is represented as icon 502, and is nested beneath icon 501 in the tree structure.

At step 403, a user associates a data set with the just-added action. This may be a previously created data set, in which case the user interface provides for selecting between existing data sets stored in database 115 which are associable with the relevant action (i.e. data sets having the appropriate variable types). Alternately, the user may be prompted to create a new data set (as in phase 203). In the context of FIG. 5, data set A is selected, this being represented by icon 503. For the sake of the present example, data set A is assumed to be a user access data set, defined by the following table:

TABLE 1

| Data Set A | | |
|---|---|---|
| Username | Password | User Type |
| John | Password2 | Normal |
| Mel | Password3 | Normal |
| Matt | Password4 | Normal |
| Bec | Password5 | Administrator |
| Carl | Password6 | Administrator |
| Steve | Password7 | Administrator |
| Adam | Password8 | Normal |

It would be possible to finalize this scenario at this point (i.e. with only the login action), and arrange for it to be executed via test tool 102. In brief, that causes framework 103 to identify the unbound test script associated with the login action. The framework then identifies the location/identifier for the relevant data-bound test script upon which the unbound script is based, and instructs the test tool to execute that script with variable values replaced with the values from first line from data set A (i.e. username=John and password=Password2), and then with values from the second line, and so on.

Step 404 includes selectively applying a filter to the data set. In the present example, the user desires to apply a filter to data set A. In particular, for the sake of this example, assume that only Administrator users are able to perform the "add" action in relation to target application 101. As such, it does not make sense to run this scenario with all users; only those with user type "Administrator". The user interface of framework 103 allows a user to define a filter for data set A in respect of the login action (although in some embodiments the filter is applied in respect of an action or scenario, as opposed to a data set). In this example, Filter I is selected, this being represented by icon 504. Filter I is user defined to filter data set A for those users having user type "Administrator". As such, the filtered data set is as follows:

TABLE 2

Data Set A, modified by Filter I

| Username | Password | User Type |
|----------|----------|---------------|
| Bec | Password5 | Administrator |
| Carl | Password6 | Administrator |
| Steve | Password7 | Administrator |

Again, it would be possible to finalize this scenario at this point. In this case, framework 103 would instruct test tool 102 to execute scripts based on the same test script, but with fewer iterations (as there are fewer lines of data).

Decision 405 determines whether there are any further actions to be added to the scenario. If not, the method completes at step 406. Otherwise, the method loops to step 402, and a further action is added.

In this example, the user proceeds to add a further action, being an "add item" action (see icon 506). This "add item" action is associated with an unbound text script in database 115 having variable types for "item name", "item color" and "item price". The user associates this action with data set B (see icon 507). This data set, as considered for the present example, is shown below.

TABLE 3

Data Set B

| Item Name | Item Color | Item Price |
|-----------|-----------|------------|
| Item 1 | Red | $0.50 |
| Item 2 | Blue | $0.45 |
| Item 3 | Green | $0.50 |
| Item 4 | Yellow | $0.50 |
| Item 5 | Purple | $1.00 |
| Item 6 | Red | $1.55 |
| Item 7 | Green | $3.50 |
| Item 8 | Yellow | $0.05 |
| Item 9 | Blue | $7.80 |

For the sake of the present example, we shall assume that the user decides not to apply a filter in respect of this data set. The user then adds a further action, being a "logout" action (see icon 507), which does not require a data set. The scenario is then finalized, and the user has the option to do nothing further, execute the scenario right away, or schedule the scenario for execution at a preferred time.

In the present embodiment, the data sets used in respect of a given scenario are combined to provide a complete scenario data set. As context, it will be appreciated that each line in a data set corresponds to an iteration of an unbound test script. That is, the exemplary scenario above involves three iterations of the login action, and nine iterations of the add item action. However, in practice, this requires nine iterations of the scenario, and therefore nine executions of all of the actions. The present embodiment accounts for the mismatch between the number of lines between the data sets of a given scenario by defining a total data set wherein the total number of lines corresponds to the greatest number of lines of any of the individual data sets, and for columns having less than that number of lines populated with values, the existing values are looped thereby to fully populate the column. This is illustrated in the tables below. Table 4 shows an incomplete data set for the scenario.

TABLE 4

Incomplete Data Set for Scenario

| Username | Password | User Type | Item Name | Item Color | Item Price |
|----------|----------|-----------|-----------|------------|------------|
| Bec | Password5 | Administrator | Item 1 | Red | $0.50 |
| Carl | Password6 | Administrator | Item 2 | Blue | $0.45 |
| Steve | Password7 | Administrator | Item 3 | Green | $0.50 |
|  |  |  | Item 4 | Yellow | $0.50 |
|  |  |  | Item 5 | Purple | $1.00 |
|  |  |  | Item 6 | Red | $1.55 |
|  |  |  | Item 7 | Green | $3.50 |
|  |  |  | Item 8 | Yellow | $0.05 |
|  |  |  | Item 9 | Blue | $7.80 |

This data set is then completed by looping values for username, password, and user type, as shown in table 5.

TABLE 5

Complete Data Set for Scenario

| Username | Password | User Type | Item Name | Item Color | Item Price |
|----------|----------|-----------|-----------|------------|------------|
| Bec | Password5 | Administrator | Item 1 | Red | $0.50 |
| Carl | Password6 | Administrator | Item 2 | Blue | $0.45 |
| Steve | Password7 | Administrator | Item 3 | Green | $0.50 |
| Bec | Password5 | Administrator | Item 4 | Yellow | $0.50 |
| Carl | Password6 | Administrator | Item 5 | Purple | $1.00 |
| Steve | Password7 | Administrator | Item 6 | Red | $1.55 |
| Bec | Password5 | Administrator | Item 7 | Green | $3.50 |
| Carl | Password6 | Administrator | Item 8 | Yellow | $0.05 |
| Steve | Password7 | Administrator | Item 9 | Blue | $7.80 |

This complete data set includes lines for each iteration of the scenario that is required for testing purposes, and is used in the subsequent driving phase.

In some embodiments, rather than defining a complete data set as an isolated action, this is completed by proxy "on the fly" during the driving phase, by automatically looping lines in a data set for a given script in a scenario where there are remaining lines in a data set for another script in that scenario. Furthermore, other embodiments adopt different approaches for completing a data set, for example including additional combinations and permutations of data (for example running every line in each data set with every line in each other data set used for the scenario). In some cases, a script is primed with a specific set of variables for the commencement of the execution of that script, and those variables optionally modified under the control of framework 103 during execution of that script.

Scenario Driving Phase

At scenario driving phase 205, framework 103 implements one or more scenarios defined at phase 204 via test tool 102

(using communications interface 111). As noted, the term "driving" is used to describe the manner by which framework 103 essentially "drives" test tool 102.

In overview, driving phase 205 includes instructing the test tool to run scripts in accordance with a scenario created via phase 204. This includes, responsive to a user command, defining data indicative of one or more data-bound test scripts based on the association of the unbound test script (i.e. an action) with a selected one or more data sets. The user command may be a direct user command (e.g. a command to run a particular scenario at that time) or an indirect user command (for example a command initiated by an execution schedule defined by the user). The defined one or more data-bound test scripts are executed via the test tool, thereby to perform testing on the target application. Results of the script executions are communicated by test tool 102 to framework 103, and stored in database 105. In the present embodiment, this is achieved by coding provided in the template footer, as discussed further below.

Figure 6:
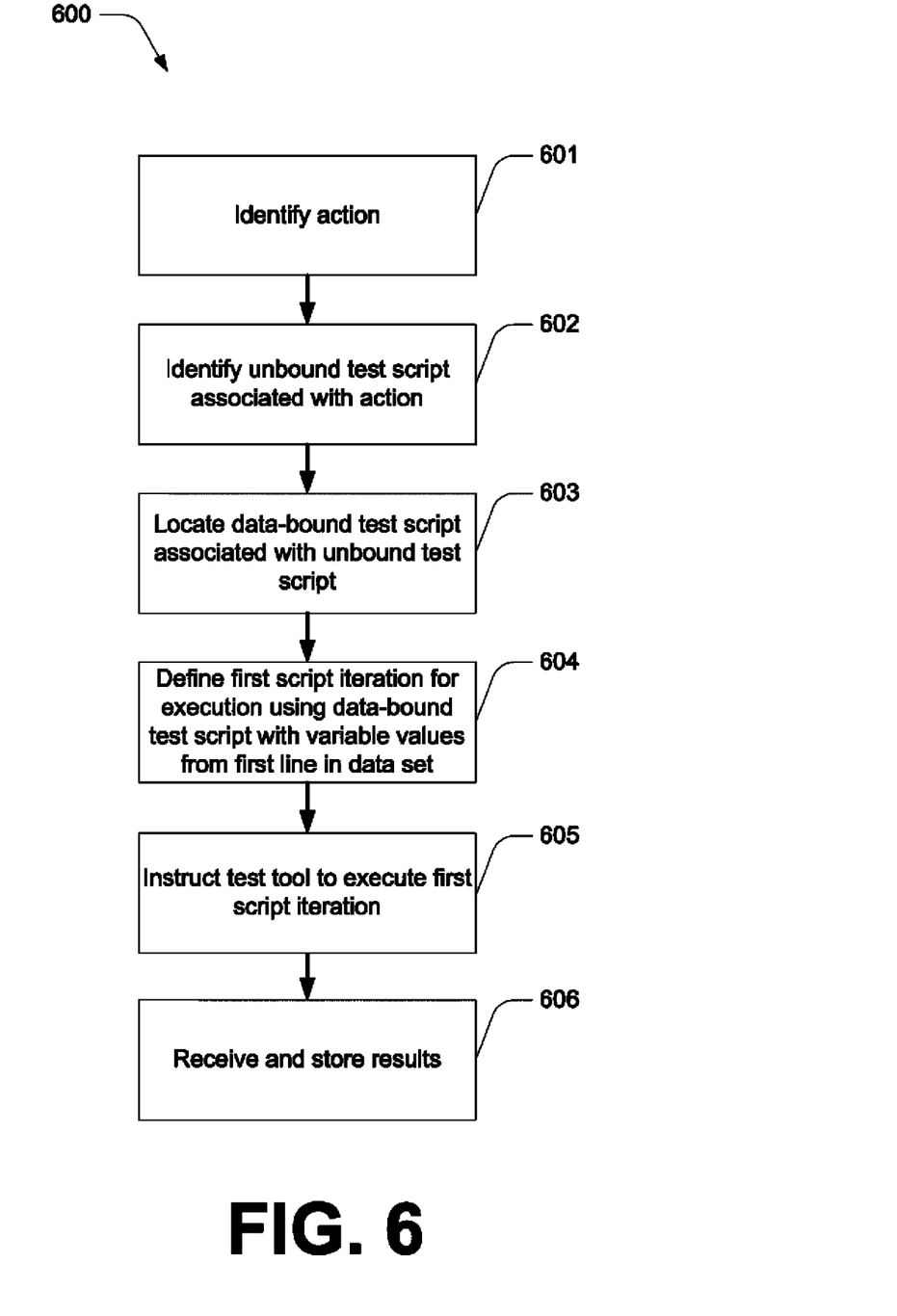
FIG. 6 illustrates a method according to one embodiment.

FIG. 6 provides an exemplary method 600 performed during phase 205 in one embodiment. In the first instance, this is described by reference to a single action in a created scenario. However, it will be appreciated that steps of the method are repeated in respect of further actions in the scenario.

Step 601 includes identifying the action, allowing for the associated unbound test script to be identified in database 115 at step 602. Then, using the script location data stored in respect of the unbound test script, step 603 includes locating the data-bound test script upon which the unbound test script (and therefore the action) is based. Step 604 includes defining a first script iteration for execution, using original data-bound test script with variable values from first line in the data set for the scenario. Framework 103 then instructs tool 102 to execute that first script iteration at step 605, and receives execution results at step 606, which are stored in database 115 thereby to allow a user to review the results of the scenario at a later stage.

In relation to step 604, the manner by which a new script iteration is defined varies between embodiments. For example, in one embodiment framework 103 (and in particular interface 110) is configured to modify the stored script (i.e. the original user-created script, or modified version thereof) to include the appropriate variable values for the relevant iteration.

Where there are multiple actions in a scenario, the general process flow according to one embodiment is as follows:

Define and execute first iteration of first action, based on first line of complete data set.
Define and execute first iteration of second action, based on first line of complete data set.
Continue until first iterations of all actions in scenario have been executed, based on first line of data set.
Define and execute second iteration of first action, based on second line of complete data set.
Define and execute second iteration of second action, based on second line of complete data set.
Continue until second iterations of all actions in scenario have been executed, based on first line of data set.
Repeat for remaining iterations (based on remaining lines of complete data set).

In this vein, using the examples in the tables above, the driving phase commences as follows:

Run login script based on variable values username=Bec and password=Password5.
Run add item script with Item Name=Item 1, Item Color=Red and Item Price=$0.50.
Run logout script (there are no variables in this script).

The driving phase then continues through the various iterations, completing with the following execution of scripts:

Run login script based on variable values username=Steve and password=Password7.
Run add item script with Item Name=Item 9, Item Color=Blue and Item Price=$7.80.
Run logout script (there are no variables in this script).

In this manner, the scenario is tested for all of the data sets selected by the user during phase 103.

As noted above, the template footer is coded such that of the script executions are communicated by test tool 102 to framework 103. For example, coding logic is included to implement the following rules:

In the event that a script executes successfully, data indicative of that success is communicated to framework 103, along with any resulting output data from target application 101.
In the event that an error occurs, a screenshot is taken of target application 101, and this is provided to framework 103 along with data indicative of the error.

In response to either of these, framework 103 is configured to instruct test tool 103 to perform the next script iteration in the process flow for the scenario. In this manner, the likelihood of an automated testing regime failing mid-course is reduced, in the sense that errors are simply noted and further instructions provided by framework 103 to test tool 102.

In some embodiments, a script is "primed" with variables for the purposes of the driving phase. For example, in some situations, to allow the execution of a given script, a particular variable must be in a specific state. In such situations, framework 103 primes the script, thereby to place the relevant variable in that state for the execution of that script. That variable may be changed during the execution of the script. Furthermore, the existence of that variable may or may not be of any consequence to the actual application under test, and it may only exist for purposes execution of the action or scenario (that is, the variable is specific to functionalities of framework 103).

CONCLUSIONS

It will be appreciated that the above systems and method are advantageous in the contest of managing testing functionalities. In particular, they allow a user to create complex testing scenarios for automated implementation without a need to learn a new scripting language, and without creating a large number of generally redundant scripts. Rather, a user is able to reuse a small group of existing scripts in various combinations with varied data sets.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer-readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; a carrier wave bearing a propagated signal detectable by at least one processor of the one or more processors and representing the set of instructions a propagated signal and representing the set of instructions; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A method for managing testing functionalities, the method being performed by a test management framework that communicates with a separate test tool, the method including the steps of:
   a. receiving data indicative of a user-created test script, wherein the user-created test script is created for execution by the test tool, wherein the user-created test script is a data-bound test script, in which the test script is bound to a set of known data values;
   b. processing the received data thereby to define data indicative of an unbound test script, wherein the processing includes:
      b1) identifying one or more data values in the user-created test script, being data values to which the user-created test script is bound;
      b2) for each identified data value, identifying a respective variable;
   such that the unbound test script is configured to be selectively bound by the test management framework to at least a first data set for a first testing scenario, by setting the or each variable with a data value from the first data set, and to a second data set for a second testing scenario, by setting the or each variable with a data value from the second data set;
   c. providing a user interface for allowing a user to instruct the test management framework to associate the unbound test script with one or more data sets selected from a repository of stored data sets without requiring the user to create a new test script, thereby enabling a one-to-many relationship between the unbound test script and the one or more data sets;
   d. responsive to a user command, performing an automated process thereby to define data indicative of a new data-bound test script based on the association of the unbound test script with the selected one or more data sets by setting the or each variable defined for the unbound test script with data values from the selected one or more data sets; and
   e. providing instructions for causing the test tool to execute the new data-bound test script.

2. A method according to claim 1 wherein the data indicative of the user-created test script is received from the test tool.

3. A method according to claim 1 wherein the data indicative of the new data-bound test script allows for modification of the user-created test script, thereby to provide script code for the new data-bound test script.

4. A method according to claim 1 wherein the unbound test script is selectively associable with any one of a plurality of data sets.

5. A method according to claim 1 wherein the unbound test script is selectively associable with a given data set or a filtered subset of that data set.

6. A method according to claim 1 wherein a given data set is associable with a plurality of unbound test scripts.

7. A method according to claim 1 wherein each unbound test script is associated with one or more actions.

8. A method according to claim 7 wherein allowing a user to associate the unbound test script with one or more data sets includes allowing the user to associate an action associated with the unbound test script with the one or more data sets.

9. A method according to claim 7 wherein the user interface allows the user to create a scenario defined by a sequence of one or more actions.

10. A computer program product, defined on non-transitory media, configured for performing a method according to any preceding claim.

11. Non-transitive computer readable media carrying instructions that, when executed by one or more processors of a computer system, cause the computer system to perform a method according to any one of claims 1 to 9.

12. A system for managing testing functionalities, the system providing a test management framework that communicates with a separate test tool, the system including:
   a. an interface for receiving data indicative of a user-created test script, wherein the user-created test script is created for execution by the test tool, wherein the user-created test script is a data-bound test script, in which the test script is bound to a set of known data values;
   b. a component for processing the received data thereby to define data indicative of an unbound test script, wherein the processing includes:
      b1) identifying one or more data values in the user-created test script, being data values to which the user-created test script is bound;
      b2) for each identified data value, identifying a respective variable;
   such that the unbound test script is configured to be selectively bound by the test management framework to at least a first data set for a first testing scenario, by setting the or each variable with a data value from the first data set, and to a second data set for a second testing scenario, by setting the or each variable with a data value from the second data set;
   c. a database for storing the data indicative of the unbound test script;
   d. user interface components for allowing a user to instruct the test management framework to associate the unbound test script with one or more data sets selected from a repository of stored data sets without requiting the user to create a new test script, thereby enabling a one-to-many relationship between the unbound test script and the one or more data sets;
   e. a component that is responsive to a user command for performing an automated process thereby to define data indicative of a new data-bound test script based on the association of the unbound test script with the selected one or more data sets by setting the or each variable defined for the unbound test script with data values from the selected one or more data sets; and
   f. an interface configured to provide instructions for causing the test tool to execute the new data-bound test script.

13. A system according to claim 12 wherein the data indicative of the user-created test script is received from the test tool.

14. A system according to claim 12 wherein the user-created test script is a data-bound test script, in which the test script is bound to a set of known data values.

15. A system according to claim 12 wherein the data indicative of the new data-bound test script allows for modification of the user-created test script, thereby to provide script code for the new data-bound test script.

16. A system according to claim 12 wherein the unbound test script is selectively associable with any one of a plurality of data sets.

17. A system according to claim 12 wherein the unbound test script is selectively associable with a given data set or a filtered subset of that data set.

18. A system according to claim 12 wherein a given data set is associable with a plurality of unbound test scripts.

19. A system according to claim 12 wherein each unbound test script is associated with one or more actions.

20. A system according to claim 19 wherein allowing a user to associate the unbound test script with one or more data sets includes allowing the user to associate an action associated with the unbound test script with the one or more data sets.

21. A system according to claim 19 or claim 20 wherein the user interface components allow the user to create a scenario defined by a sequence of one or more actions.

* * * * *